(12) United States Patent
Wappler et al.

(10) Patent No.: US 11,507,918 B2
(45) Date of Patent: Nov. 22, 2022

(54) AUTOMOTIVE ASSET LOCATION MANAGEMENT SYSTEMS AND METHODS

(71) Applicant: Surgere, LLC, Uniontown, OH (US)

(72) Inventors: William Wappler, Green, OH (US); David Hampton, Ann Arbor, MI (US); Robert Fink, Hudson, OH (US); Michael Curran, Canton, OH (US)

(73) Assignee: Surgere, LLC, Uniontown, OH (US)

( * ) Notice: Subject to any disclaimer, the term of this patent is extended or adjusted under 35 U.S.C. 154(b) by 363 days.

(21) Appl. No.: 16/130,241

(22) Filed: Sep. 13, 2018

(65) Prior Publication Data

US 2019/0026690 A1 Jan. 24, 2019

Related U.S. Application Data

(63) Continuation-in-part of application No. 15/950,454, filed on Apr. 11, 2018, now Pat. No. 11,138,553.

(Continued)

(51) Int. Cl.
*G06Q 10/08* (2012.01)
*G06K 7/10* (2006.01)
(Continued)

(52) U.S. Cl.
CPC ....... *G06Q 10/087* (2013.01); *G06K 7/10128* (2013.01); *G06K 19/0723* (2013.01);
(Continued)

(58) Field of Classification Search
CPC ...... G06Q 10/087; G06Q 10/02; G06Q 10/06; G06Q 10/10; G06Q 30/00; G06Q 50/04; G06K 7/10128; G06K 19/0723
See application file for complete search history.

(56) References Cited

U.S. PATENT DOCUMENTS

2007/0008184 A1 1/2007 Ho et al.
2008/0086320 A1* 4/2008 Ballew ............... G06Q 10/00
 705/342

(Continued)

FOREIGN PATENT DOCUMENTS

CN 103440568 A 12/2013
JP 2004323199 A 11/2004
(Continued)

OTHER PUBLICATIONS

International Search Report PCT/US2019/024778 dated Jul. 24, 2019.
(Continued)

*Primary Examiner* — A. Hunter Wilder
*Assistant Examiner* — Joseph M Mutschler
(74) *Attorney, Agent, or Firm* — Clements Bernard Walker; Richard A. Walker

(57) ABSTRACT

Disclosed herein are systems and methods for tracking and managing location information for automobile assets. By affixing passive transmitter tags with unique identification information to automobile assets, location information may be associated with designated areas and/or location information by scanning the passive transmitter tags at various scan points. The location and automobile asset information may be stored, read, and updated in a centralized cloud database platform, accessible at varying levels to suppliers, manufacturers, shippers, and others.

17 Claims, 7 Drawing Sheets

Related U.S. Application Data

(60) Provisional application No. 62/685,484, filed on Jun. 15, 2018, provisional application No. 62/672,661, filed on May 17, 2018, provisional application No. 62/559,016, filed on Sep. 15, 2017, provisional application No. 62/485,236, filed on Apr. 13, 2017.

(51) Int. Cl.

| | | |
|---|---|---|
| *G06K 19/07* | (2006.01) | |
| *G06Q 50/04* | (2012.01) | |
| *G06Q 10/10* | (2012.01) | |
| *G06Q 30/00* | (2012.01) | |
| *G06Q 10/06* | (2012.01) | |
| *G06Q 10/02* | (2012.01) | |

(52) U.S. Cl.
CPC ............ *G06Q 10/02* (2013.01); *G06Q 10/06* (2013.01); *G06Q 10/10* (2013.01); *G06Q 30/00* (2013.01); *G06Q 50/04* (2013.01)

(56) References Cited

U.S. PATENT DOCUMENTS

| | | | | |
|---|---|---|---|---|
| 2008/0270076 | A1* | 10/2008 | Breed | G06F 3/0233 |
| | | | | 702/185 |
| 2009/0008450 | A1* | 1/2009 | Ebert | G06Q 10/08 |
| | | | | 235/439 |
| 2014/0018059 | A1* | 1/2014 | Noonan | H04W 16/32 |
| | | | | 455/419 |
| 2014/0074667 | A1* | 3/2014 | Smith | G01S 13/74 |
| | | | | 705/28 |
| 2014/0279297 | A1 | 9/2014 | Morgan et al. | |
| 2015/0381947 | A1* | 12/2015 | Renkis | G08B 13/196 |
| | | | | 348/159 |
| 2017/0023377 | A1* | 1/2017 | Burtner | G08B 13/2462 |
| 2017/0230790 | A1 | 8/2017 | Skomra | |
| 2019/0026690 | A1 | 1/2019 | Wappler et al. | |

FOREIGN PATENT DOCUMENTS

| | | |
|---|---|---|
| JP | 2013257194 A | 12/2013 |
| JP | 2014040317 A | 3/2014 |
| KR | 20120109163 A | 10/2012 |
| WO | 2007110964 A | 10/2007 |

OTHER PUBLICATIONS

Nov. 9, 2021 European Search Report issued in International Application No. 19785553.9.

Notice of Reason for Rejection issued in corresponding Japanese Patent Application No. 2021-505180.

* cited by examiner

AUTOMOTIVE ASSET LOCATION MANAGEMENT SYSTEMS AND METHODS

CROSS-REFERENCE TO RELATED APPLICATION(S)

The present patent application claims priority to U.S. Provisional Application No. 62/685,484, filed Jun. 15, 2018, and entitled "Automotive Parts Logistics Management Systems with Reusable RFID Containers"; U.S. Provisional Application No. 62/672,661, filed May 17, 2018, and entitled "Automotive Supply Chain Data Ecosystem"; U.S. patent application Ser. No. 15/950,454, filed Apr. 11, 2018, and entitled "Geolocation Specific Asset Tracking with Transmitters", which in turn claims priority to U.S. Provisional Application No. 62/485,236, filed Apr. 13, 2017, and entitled "Geolocation Specific Asset Tracking with Transmitters"; and U.S. Provisional Application No. 62/559,016, filed Sep. 15, 2017, and entitled "RFID Tag Asset Location and Tracking Systems and Methods", the entire disclosures of which are incorporated herein by reference.

FIELD OF THE DISCLOSURE

The present disclosure relates generally to automotive asset management and supply chain logistics. More specifically, the present disclosure relates to systems and methods for locating, tracking, and managing a wide variety of manufactured goods, such as automotive assets, vehicles, automotive parts, containers, and the like, using passive transmitter tags that may be scanned by stationary and/or mobile scanning devices, associated with asset and location information, and updated in a centralized platform.

BACKGROUND OF THE DISCLOSURE

Independent solutions and differing requirements have driven up the development costs of stand-alone supply chains, eliminated the potential benefits of coordinated development, and created confusion for common business partners trying to serve original equipment manufacturers (OEMs) with different technologies addressing varied requirements.

For example, in conventional automobile manufacturing facilities storing hundreds or even thousands of automotive assets on storage lots, transportation personnel (e.g., truck drivers and/or train workers) may be merely given the make, model, color, and VIN of the car or truck to be picked up and shipped. However, these storage lots on the grounds of manufacturing facilities can be very large. Thus, in a rush to start hauling their assigned shipment, transporters will pick up a car or truck that is a similar make, model, and color, but have the incorrect VIN because they want to get on the road/rail to be paid as quickly as possible. These errors may add huge time costs into managing the inventory and correcting resulting issues.

Previous shipyard management systems utilize location databases and mapped out facilities for processing shipping container pick-ups and drop-offs. However, these shipyard systems are limited to cargo containers that may not be moved without the assistance of a crane or truck. Thus, manual entry of location updates for any particular shipping container is built-in to the process flow based on the planned and tracked operations of the vehicles equipped to move the shipping containers.

Prior warehouse logistics systems use radio frequency identification (RFID) tags on crates, packages, and/or pallets to track inventory within a building facility. However, these indoor facilities are for smaller assets and often utilize precise shelving arrangements and cataloguing systems to track the movement of goods around the warehouse. Moreover, warehouse facilities do not often have to deal with external transporters or carriers coming within the warehouse stocked inventory themselves to pick-up assigned items to be shipped.

Issues continue to exist with manufacturing facilities that store large inventories of similar looking manufactured items and/or automotive assets, such as cars and trucks, on facility grounds with vast outdoor storage lots. Therefore, systems and methods are still needed to provide the above solutions and more information about automotive assets without adding to costs, such that the assets may be better tracked and managed.

BRIEF SUMMARY OF THE DISCLOSURE

The present disclosure addresses the issues associated with logistics management of automotive assets within and throughout various facilities and their storage lots.

In general, all suppliers and OEMs order, ship, receive, pack, and consume parts, as well as process assets and containers at their facilities. This commonality may be used to standardize supply-chain methodologies and to allow for automated information management and selective data sharing. All businesses desire simplicity and commonality, including speed to implementation, low cost, enhanced breadth and depth, and adherence to supply constraints. Implementing a supply-chain visibility model that standardizes management points and provides transparency related to supplier and/or manufacturer inventory would be advantageous. These models and systems may include manual data interaction and/or automated data recordation using passive transmitter tags, for example. A common integration and analytics platform may be provided to manage and provide asset data. The platform may leverage passive transmitter tag scanning portals and handheld scanning devices, thereby providing a 99.9% data collection tolerance. Passive transmitter tags may include enhanced encoding ability and versatility for correlating data to associated assets (such as packing, parts, and products).

In various exemplary embodiments, the present description discloses automotive asset location management systems that aggregate, compile, and provide visibility of supply-chain data acquired from sensor technology. The systems may be used by participating entities authorized by the participants and their agents, acquired through common supply-chain capture points. Readable data used by the logistics management system may include real time locations, velocities, and analytical statistics associated with the movement of automotive assets, reusable RFID containers, parts, and/or other supply-chain support components, for example.

The automotive asset location management system may allow for end-to-end visibility through the data collection and authorized sharing. Further, the logistics management system may allow participation of tiered suppliers in supply-chain visibility. A data ecosystem governance committee may select and apply various participation methodologies, for example. Aggregate data may be available in a common database platform extensible to the logistics management system participants. This is provided through a reduced-cost cloud-based integration and analytics platform to address issues and provide commonality to a mass-collective of OEMs and suppliers.

The present disclosure provides systems and methods that utilize passive transmitter tags in combination with both low-power and high-power fixed and handheld scanning devices in communication with a cloud server database. The systems may acquire, track, and report automotive asset location specific to the manufacturing plant yard (i.e., the inventory), as well as production milestone events.

Users of the system may be able to see automotive asset location information and produce reports via software provided by the system developer. Additionally, integration may be required to pass automotive asset information and location data, including, for example, the Vehicle Identification Number (VIN) for an automobile and current geolocation to the manufacturer's current (i.e., legacy) tracking system.

In some embodiments, a logistics management system may include acquiring data from a plurality of assets including a plurality of tags at a plurality of stationary portals or mobile device locations, wherein the data is acquired at a secured local layer; transmitting the acquired data to a remote integration and analytics platform residing in a cloud network; applying analytics to the acquired and transmitted data at the remote integration and analytics platform; and selectively granting tiered access to the acquired and transmitted data and the applied analytics to one or more participants comprising one or more original equipment manufacturers, suppliers, and authorized parties, wherein the access is selectively granted at a secured application layer that is separate and distinct from the secured local layer; wherein one or more of the above steps conform to one or more predetermined standards.

Improved supply chain methodologies, such as those disclosed herein, provide numerous benefits and opportunities. For example, a common database platform may improve information flows between OEMs and suppliers. Having data concentrated in one updatable cloud storage point may lead to better management of automotive assets, containers, and associated materials, such as lids, pallets, packaging, and dunnage. Optimizing timing of pick-ups, delivery, and transport may lower costs associated with assets and reusable containers by minimizing costs of ordering, moving, and unexpected events, as well as eliminating expendable supplementary assets and containers. Further advantages may include eliminating costs associated with the status quo; improving OEM and supplier visibility when returning assets and/or containers; reducing expendable usage; avoiding and tracking quality issues; positioning the right assets and/or containers in the right quantities where and when they are needed; proactively managing asset inventory, shared dwell time, velocity, and fleet utilization analytics; avoiding unplanned or buried costs; benefiting large processes inside supplier facilities when asset and/or container inventory is inaccurate; removing the need for manual hunting for assets and/or containers; improving repair processes and tracking; creating pooled fleets; verifying fleet purchases and production readiness; cutting off amortization in piece/unit price; adding visibility to the repositioning of assets and/or containers; eliminating paying for the same assets and/or containers twice; reducing return centers and handling via fewer containers; flagging potential returns issues before they become a problem; improving the labor in the last mile; improving corrugate and other materials handling (e.g., wood pallet recycling, warehouse stacking efficiency); minimizing inventory loss; maximizing logistics efficiency (e.g., expediting returns and inbounds, better utilizing lost trailers); recapturing missed commercial cost reductions; optimizing fleet size; and improving cost of capital.

Thus, automotive assets logistics management systems of the present disclosure would be valuable among packaging, parts, tools, trailers, finished goods, and any other assets of value. Automotive assets with passive transmitter tags may minimize the time costs of reading and recording data as well as eliminate human error in misreading or mistyping data at different locales. Logistics management systems may provide visibility and control, thereby allowing mass collaboration between OEMs, suppliers, and their authorized logistics partners to harmoniously manage said assets moving through their supply chains.

BRIEF DESCRIPTION OF THE DRAWINGS

The presently disclosed systems and methods illustrated and described herein with reference to the drawings, in which.

DETAILED DESCRIPTION OF THE DISCLOSURE

In general, the automotive asset location management systems and methods of the present disclosure advantageously utilize inexpensive passive transmitter tags (e.g., radio frequency identification (RFID) tags), therefore requiring significantly less complex and costly tag reader and/or scanner equipment or infrastructure than conventional asset location and tracking systems and methods. Location information (e.g., longitude, latitude, Global Positioning System (GPS) information) may be leveraged to accurately assign designated areas and associate the designated areas with an automotive asset. The location information may be assigned to designated areas by exploiting extensive survey data. The implementation of the systems and methods of the present disclosure is flexible and may inherently provide velocity metrics, highlighting how quickly an automotive asset moves through a facility. The location management system may automate and reduce the amount of time currently spent determining and managing the location of automotive assets, vehicles, automotive parts, containers, and the like. Milestone events may be captured and saved within the automotive asset location management system with no human involvement. Automotive asset data may be searched and displayed through a simple user interface.

Figure 1:
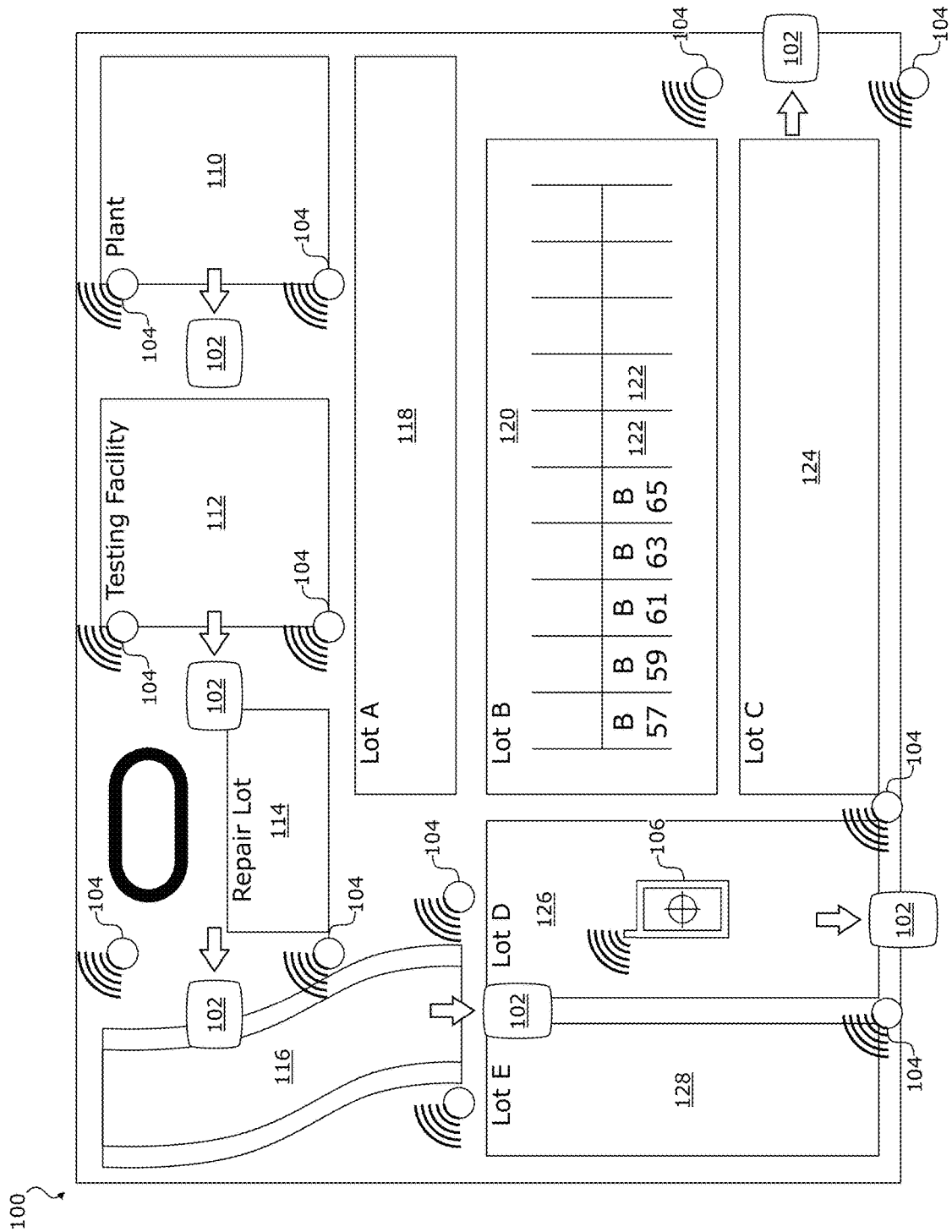
FIG. 1 is a schematic diagram illustrating automotive assets with passive transmitter tags moving around designated areas of an example facility compound equipped with scanning devices in communication with a location management system, in accordance with the present disclosure.

The tracking of assets is a critical aspect of inventory management. As shown in FIG. 1, a facility compound or grounds 100 may include various regions, areas, buildings, etc., throughout which automotive assets 102 may be moved and/or stored. The facility compound 100 may include automotive manufacturing facilities, for example, in which newly manufactured vehicles or other automotive assets 102 may be stored on a storage lot (e.g., Lot A 118) or other designated area, such as a repair lot 114. From a designated area, such as Lot D 126, a truck driver may load an automotive asset 102 (e.g., a newly manufactured car or truck) onto a trailer for delivery to an automotive dealership or other external facility. As another example, a train worker may load an automotive asset 102 onto a train for later delivery elsewhere. The truck drivers and train workers may be working within tight transportation deadlines, so it is in their interest to pick up the automotive assets 102 as quickly as possible. The particular automotive assets 102 assigned to the transporter for pick-up may be located within a designated area, such as Lot C 124, near the train tracks. The identification information (e.g., make, model, color, and Vehicle Identification Number (VIN)) of the automotive assets 102 as well as their location information may be provided to the assigned transporter to facilitate a quick pick up with minimized error.

Rather than adding further manual steps to the logistics management process, the asset management system of the present disclosure may include tagging the automotive assets 102 with passive transmitter tags. These tagged automotive assets 102 may then be automatically tracked as they are moved around the facility compound 100 by fixed transceivers or scanning devices 104. These scanning devices 104 may be positioned according to the designated areas within the facility compound 100, such that as an automotive asset 102 moves past a scanning device 104, the system automatically updates the location information for the automotive asset 102 to the designated area associated with that scanning device 104. The scanning devices 104 may be standard RFID fixed portals consisting of one RFID reader and two proprietary antennas per portal.

Alternatively, handheld scanners 106 may be used to automatically scan automotive assets 102 nearby. The location information of the handheld scanner 106 when a particular automotive asset 102 is scanned (i.e., scan point) may be cross-referenced with a designated area and/or region of the facility compound 100. For example, an automotive asset 102 in one of the designated areas 122 (e.g., B-65) within the designated region, Lot B 120, may be scanned by the handheld scanner 106. The location information of the handheld scanner 106 at the scan point near B-65 may be received by the system, which then associates the automotive asset 102 with both the designated area 122, B-65, and the designated region, Lot B 120. The handheld scanners 106 may be RFID handheld or mobile devices. The system may acquire, track, and report vehicle (or other asset) location specific to a given designated region in the facility compound 100, as well as production milestone events.

Figure 2:
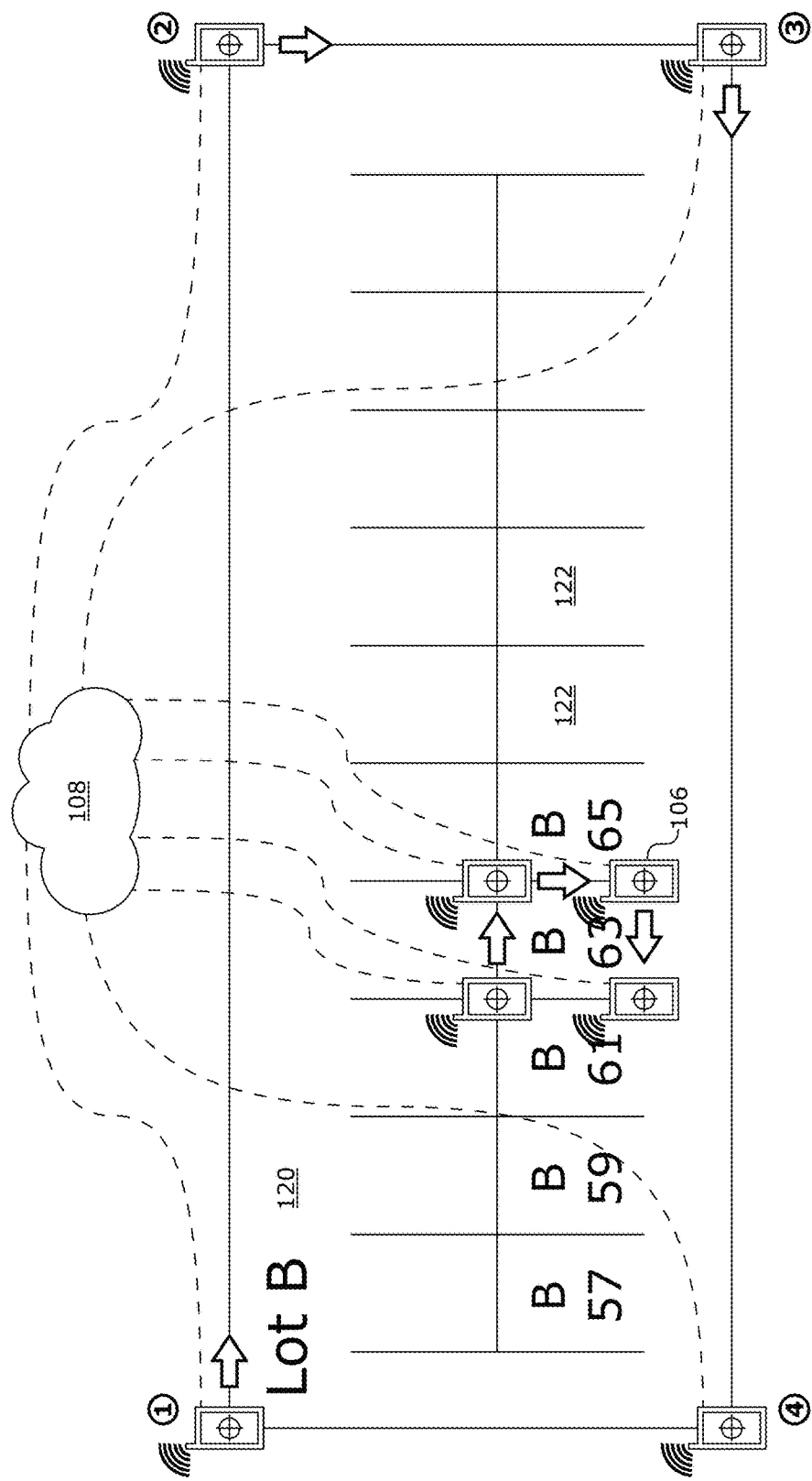
FIG. 2 is a schematic diagram illustrating an example method of using a device to assign and upload location information to designated areas, in accordance with the present disclosure.

The entire facility compound 100 may be setup with designated regions and/or areas associated with location information. As shown in FIG. 2, the handheld scanner 106 may be used to demarcate the perimeter of the designated regions and/or areas within the facility compound 100. In step 1, the handheld scanner 106 is physically positioned over one point of the perimeter of the designated region, Lot B 120, and the location information is uploaded to the system, which may be stored on a cloud-based server 108. The cloud server 108 may store a database, which is part of the location management system. In step 2, the handheld scanners 106 (and/or another handheld scanner) is positioned over another point along the perimeter of the designated region, Lot B 120, and the location information is again uploaded to the cloud 108 and associated with the second point of the region's perimeter. In steps 3-n, the third through nth points along the perimeter of the designated region are associated with the location information of the handheld scanner 106 uploaded to the cloud 108. The location information (e.g., coordinates) of the n points associated with the designated region may be extrapolated into a polygon or other shape and displayed on a map created within the system. Further, the system may determine the location information of a virtual center point for a designated region and/or area based on the location information of the perimeter points. Additionally, multiple designated areas 122 within the designated region 120 may be similarly mapped out according to the location information of points uploaded to the cloud 108. The location information may include the latitude and/or longitude information for the point. Further, the elevation information for the point may be included as part of the location information. The elevation may be useful for storage lots and/or facilities that include stacked and/or multiple levels of assets. Rather than using a handheld scanner 106 to map out the designated areas, a drone or other automated device may be used to save the location information (e.g., latitude, longitude, elevation) of the selected points along the perimeter and/or virtual surface of the designated area. This collected location information may be saved to the device locally and later uploaded to a server 108.

Figure 3:
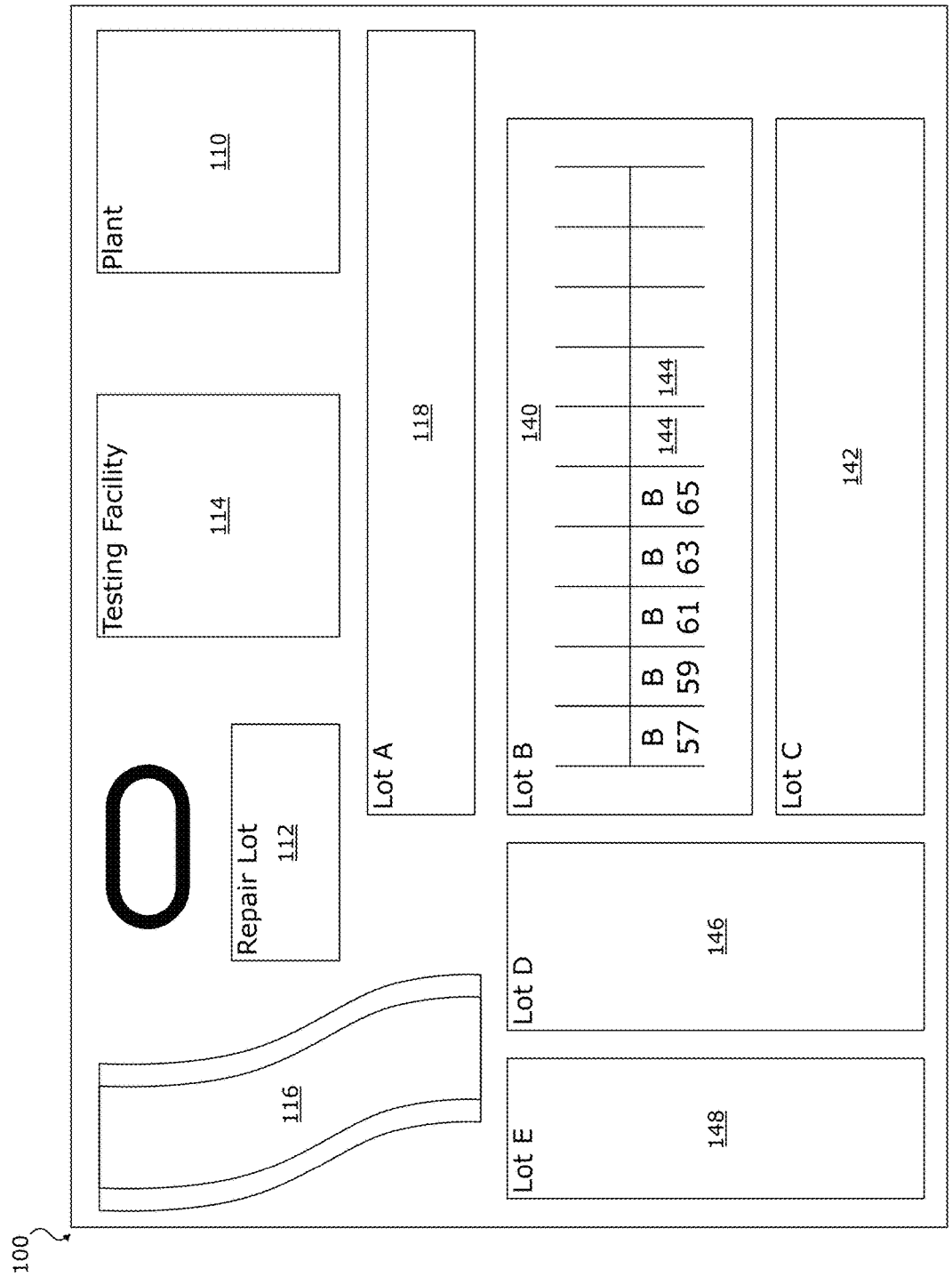
FIG. 3 is a schematic diagram illustrating example designated areas assigned within a facility compound, in accordance with the present disclosure.

As shown in FIG. 3, the steps for setting up the designated regions and/or areas of the facility compound 100 may be repeated as desired. For example, the designated areas within one facility compound 100 may number in the thousands. The mapped out designated regions and/or areas of the facility compound 100 may include buildings, such as a manufacturing plant 110 and/or a testing facility 112. The manufacturing plant 110 may be building or structuring typically having upstanding exterior facing sidewalls having opposed outer and inner surfaces defining an interior space, for example. Within the interior space of the manufacturing plant 110 may be where a primary portion of the automotive assets 102 are assembled or fabricated. The manufacturing plant 110 may be an automobile manufacturing facility, and the assets 102 may be cars, trucks, or the like. The manufacturing plant 110 may include at least one opening in the exterior sidewalls that is sized to permit the automotive assets 102 to enter and exit the manufacturing plant 110. The opening may be used to permit automotive assets 102 to leave the manufacturing plant 110 and be transported to exterior designated lots.

The facility compound 100 may include a storage lot 118, exterior to the manufacturing plant 110 for storing the automotive assets 102. The system may incorporate a pathway extending between components of the system and relative terms such as upstream or downstream may be used for reference purposes to explain some components relative to others with respect to movement of the automotive asset 102 along the pathway.

In some embodiments, the automotive assets 102 exiting the manufacturing plant 110 may travel along the pathway, which is may be referred to as a "leaving line." The leaving line may pass through the opening in the exterior wall of the manufacturing plant 110. The pathway may be sized to permit the automotive assets 102 to move therealong. Further, in some embodiments, the pathway may extend from the manufacturing plant 110 to the exterior designated lots.

A region may be designated as a repair lot 114, where assets from the product stream that need to return to the plant 110 or other facility may be pulled and temporarily stored until re-introduced into the product stream. For example, if the automotive asset 102 is a container, it may be temporarily pulled from the product stream until a missing automotive part that is supposed to be included within the order may be supplied to the container. Additionally, moving an automotive asset 102 to the repair lot 114 may automatically update the status of the automotive asset 102 within the location management system in the cloud 108 and/or indicate that the asset 102 should not be shipped until further notice.

Each designated region and/or area may include a scanning device 104 associated with the location. The scanning device 104 associated with a designated region and/or area may automatically update the location information of a tagged automotive asset 102 in the cloud 108 as the tagged automotive asset 102 is moved near the scanning device 104. A designated region and/or area of the facility compound 100 may include multiple scanning devices 104 associated with the designated region and/or area. Each of the scanning devices 104 may be associated with an entrance and/or exit to the designated region and/or area. For example, when a tagged asset 102 comes within a predetermined distance from the scanning device 104 associated with the exit from the designated region, the location information of the asset 102 may be automatically updated to "In Transit" or another status by the system. The fixed scanning device 104 may be built-in to a building within the facility compound 100 and hard-wired to a power source and/or network hub. Alternatively, the fixed scanning device 104 may be freestanding or somewhat movable around the facility compound 100 with a remote power source (e.g., battery, solar panel) and wireless networking capabilities (e.g., Wi-Fi, cellular).

The fixed scanning device 104 may be installed near the opening and proximate the leaving line or pathway. In some embodiments, the scanning device 104 may be positioned within the interior of the manufacturing plant 110 near the opening. In other embodiments, the scanning device 104 may be positioned outside the manufacturing plant 110 near the opening. The operator may install fixed scanning devices 104 at various locations within or near the manufacturing plant 110, the repair facilities, the overflow facilities, or other areas throughout the facility compound 100. Alternatively, if retro-fitting the location management system of the present disclosure to an existing manufacturing facility, the fixed scanning devices 104 may be connected to existing legacy structures, thereby allowing them to draw power from existing power networks. For example, the fixed scanning devices 104 may be connected to existing lamp posts, light fixtures, lighted signs, garage doors, or other items that could structurally support a fixed scanning device 104 and has an existing legacy power grid. In some embodiments, the fixed scanning devices 104 may be strategically placed to capture milestone events, such as the completion of the manufacture, an occurrence of repair, or the movement of the automotive asset 102 from one location to another, as well as the geolocation of the automotive asset 102 based on GPS-coordinates associated with the passive transmitter tag 130.

In some embodiments wherein the facilities include stacked and/or multilevel storage arrangements, the fixed scanning devices 104 may be built-in or attached to the shelving, multilevel structures, and/or other stacked facility arrangements.

When a tagged asset 102 is scanned by a scanning device 104 and/or handheld scanner 106 within the system, the time and date information as well as the location information may be uploaded to the cloud 108. In this way, the last known scan point of the tagged asset 102 may be catalogued. Additionally, all of the location information and other data for each automotive asset 102 may be tracked and stored according to blockchain methods, such that past data is never lost. In this way, the movement of multiple assets 102 over time may be tracked and compared for data analysis or forensics purposes, for example.

Figure 4:
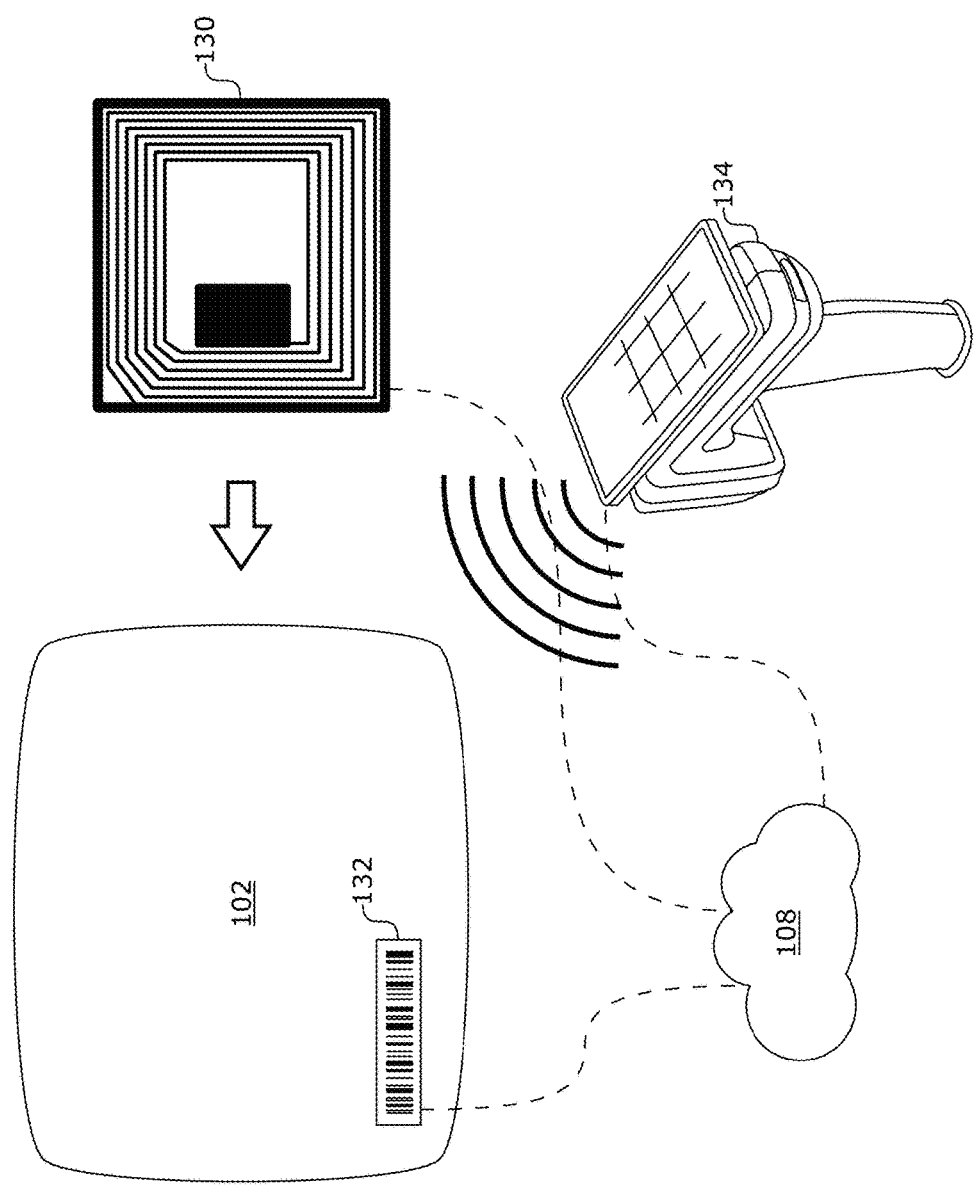
FIG. 4 is a schematic diagram illustrating an example passive transmitter tag being affixed and associated with an automotive asset using a handheld scanner in communication with a location management system, in accordance with the present disclosure.

As shown in FIG. 4, during or after the manufacturing or fabrication process, a passive transmitter tag 130 may be affixed to, installed, or otherwise connected to an automotive asset 102. The automotive asset 102 may include asset identification information 132, such as a VIN, for example. The VIN may be associated with various data about the automotive asset 102, such as make, model, color, etc., which may also be stored in the cloud 108. The passive transmitter tag 130 may include unique identification information, such as a serial number. The passive transmitter tag 130 and asset identification information 132 may be scanned by a scanner 134, which may associate the asset identification information 132 with the unique identification information of the passive transmitter tag 130 within the location management system on the cloud 108.

In some embodiments, the location management system begins when the manufacturer finishes manufacturing and/or preparing the automotive asset 102. During the finishing, the manufacturer may apply passive transmitter tag 130 to the automotive asset 102. The manufacturer or a computer automatically codes or programs the passive transmitter tag 130 to include asset identifying information, such as a VIN, to the signal that is to be transmitted by the passive transmitter tag 130. In some embodiments, the programming of the passive transmitter tag 130 may be accomplished by scanning the passive transmitter tag 130 with the scanner 134. The scanning of the VIN and the passive transmitter tag 130 associates the two together, and the associated information may be transferred from the scanner 134 to a central cloud server 108 having program logic and a non-transitory storage medium having instructions encoded thereon that when executed by one or more processors perform operations to identify and track the geolocation of the automotive asset 102. The central cloud server 108 may store the automotive asset 102 information in a format configured to easily recall and obtain information therefrom for later use. Furthermore, the passive transmitter tag 130 may geolocate its position based on a GPS device and may provide the geolocation to central cloud server 108.

In some embodiments, the passive transmitter tag 130 may be an RFID chip or tag. For example, the passive transmitter tag 130 may use the AIAG GS1 GRAI 96 RFID Tag Standard, which is flexible and allows for add-on functionality. Other transmitters associated with identifying information of the automotive asset 102 are also possible. The scanning devices 104 may be fixed RFID transceivers and/or portals, including one RFID reader and at least two antennas per portal. Alternatively, the scanning devices 104 may each include a single antenna. The handheld scanner 106 may be a handheld mobile computer with a global positioning system (GPS) and a mobile RFID data capture device tethered together to produce simultaneous tag and latitude/longitude reads. Barcode scanners may be installed near an assembly line of the manufacturing facility 110 to associate RFID tags to VIN tags. Saturated plant Wi-Fi may be utilized to pass RFID tag and VIN associations to the database of the location management system. For vehicle assets 102, RFID tags may be installed on the windshield or near the bumper (e.g., one per vehicle). Cellular modems may be used for all fixed RFID portals that are outside of the manufacturing plant 110 or away from the plant network. Battery packs or solar powered batteries may be used for all fixed portals 104 that are not located near available AC power.

In some embodiments, the system may include encoding logic configured to associate the passive transmitter tag 130 with asset identification information, such as a VIN or a serial number. In some embodiments, the passive transmitter tag 130 may be associated with GPS coordinates to allow the system to store the geolocation of the passive transmitter tag 130 connected to the automotive asset 102 at any given time. For example, if the passive transmitter tag 130 is an RFID tag, and the automotive asset 102 is a vehicle in a manufacturing plant 110, the passive transmitter tag 130 may be attached to the vehicle and associated with the VIN of the vehicle, and a GPS device may calculate the location of the vehicle within the interior of the manufacturing plant 110.

In some embodiments, as the automotive asset 102 travels along the pathway, the passive transmitter tag 130 may transmit signals associated with the asset identification information 132 of the automotive asset 102 and its GPS determined location. Thus, the scanning device 104 may be able to determine the location and directional movement of the automotive asset 102 along the pathway.

In some embodiments, a secondary facility may be positioned along the pathway downstream from the manufacturing plant 110. The secondary facility may be a logistics facility. The location management system may determine what logistical information will be implemented to effectuate the delivery of the automotive asset 102 to an end destination, which is downstream from the manufacturing plant 110. A scanning device 104 may be positioned along the pathway near the secondary facility. The scanning device 104 may be located either within the interior of the secondary facility or outside of the secondary facility. In each instance, the scanning device 104 may receive transmitted information from the passive transmitter tag 130 on the automotive asset 102. The scanning device 104 may transmit the information about the automotive asset 102, including GPS-based geolocation, to a central cloud server 108, which may be coupled to a non-transitory storage medium.

In some embodiments, the testing facility 112 may be positioned along the pathway downstream from the manufacturing plant 110. In other embodiments, the testing facility 112 may be downstream from the secondary facility. The testing facility 112 may be configured to test the quality of the automotive asset 102 against a set of standards that may be set by either the manufacturer or a government entity. For example, in the example of a vehicle as the automotive asset 102, the quality of the vehicle may be required to meet certain company standards, as well as governmental standards, such as emissions ratings, crash ratings, other safety standards, or the like. A scanning device 104 may be positioned along the pathway near the testing facility 112. The scanning device 104 may be located either within the interior of the testing facility 112 or outside of the testing facility 112. In each instance, the scanning device 104 may receive transmitted information from the passive transmitter tag 130 on the automotive asset 102. The scanning device 104 may transmit the information about the automotive asset 102, including GPS-based geolocation, to a central cloud server 108, which may be coupled to a non-transitory storage medium.

In some embodiments, a repair facility may be located along a portion of the pathway. In the event that the testing facility 112 determines that the automotive asset 102 fails to meet initial quality standards based on the test track results, such as if the emissions requirements are not met or if the engine performance thresholds are not met, then the automotive asset 102 may be sent to the repair facility for repair. Within the repair facility, the automotive asset 102 may be repaired to bring it up to acceptable standards. Then, the automotive asset 102 may be sent back to the testing facility 112 to be re-tested against the set of thresholds. If the automotive asset 102 does not pass the test, then it is sent back to the repair facility. This process is repeated until the automotive asset 102 passes the tests. Once all the tests have been successfully passed, the automotive asset 102 continues along the pathway.

In some embodiments, an overflow repair facility may be positioned along the pathway. The overflow repair facility may be configured to repair the automotive asset 102 in response to a notification that the automotive asset 102 does not meet desired quality or standards during the manufacturing process in the manufacturing plant 110.

In some embodiments, a pay point station or facility may be located downstream from the testing facility 112. The pay point facility may include a plurality of bays configured to at least temporarily store the automotive asset 102. The pay point station may capture and record event information pertaining to the automotive asset 102. A scanning device 104 may be positioned along the pathway near the pay point station. The scanning device 104 may be located either within the interior of the pay point station or outside of the pay point station. In each instance, the scanning device 104 may receive transmitted information from the passive transmitter tag 130 on the automotive asset 102. The scanning device 104 may transmit the information about the automotive asset 102, including GPS-based geolocation, to a central cloud server 108, which may be coupled to a non-transitory storage medium.

In some embodiments, a checkpoint 116 may be downstream from the pay point station along the pathway. The checkpoint 116 may be a choke point in a road where the automotive assets 102 pass along while moving along the pathway. The checkpoint 116 may be a raised portion of a road such that all the checkpoint 116 must be driven "over the hill." A scanning device 104 may be positioned along the pathway near the checkpoint 116. In some embodiments, the scanning device 104 may be installed beneath the road surface such that when the automotive asset 102 passes "over the hill" or otherwise moves along near the scanning device 104, the passive transmitter tag 130 passes the asset identification information 132 to the central cloud server 108 to indicate that the automotive asset 102 is moving along the pathway through the checkpoint 116 and towards the designated storage lots. In other embodiments, the scanning device 104 may be located either within the interior of the checkpoint 116 or outside of the checkpoint 116. In each instance, the scanning device 104 may receive transmitted information from the passive transmitter tag 130 on the automotive asset 102. The scanning device 104 may transmit the information about the automotive asset 102, including GPS-based geolocation, to a central cloud server 108, which may be coupled to a non-transitory storage medium.

The tracking logic of location management system may determine that the automotive asset 102 is being placed into the a designated storage lot (e.g., Lot E 128) and whether automotive asset 102 is to be put into the queue for being hauled away via transportation truck or whether the automotive asset 102 is to be railed away via train.

The designated storage lot may also be referred to an inventory lot or queue. The designated storage lot may be along the pathway downstream from the checkpoint 116. In some embodiments, the designated storage lot may be a parking lot that is distinct and separate from the manufacturing plant 110. If the automotive assets 102 are vehicles, the designated storage lot may be sized to store vehicles within parking spots painted atop a ground surface or paved surface. The designated storage lot may be further sized to enable an operator to traverse the designated storage lot with the handheld scanner 106. An operator or employee of the operator may walk the lot or may ride the lot in a golf cart or other similar people moving cart. In some embodiments, the handheld scanner 106 may be a handheld RFID scanner. The handheld RFID scanner may capture and transmit the current location of the automotive asset 102 to a central cloud server 108. Alternatively, the handheld RFID scanner may record the vehicle location to an internal memory on the handheld RFID scanner for later transmission into the central cloud server 108. In some embodiments, the handheld RFID scanner may also determine which "spot" the vehicle is located in based on the GPS coordinates that are associated with the passive transmitter tag 130. For example, a first vehicle having a first transmitter may be read from the RFID scanner to indicate that the first vehicle is located in spot A-21 associated with a first GPS-based geolocation. A second vehicle having a second transmitter may be read from the RFID scanner to indicate that the second vehicle is located in spot A-22 associated with a second GPS-based geolocation. A third vehicle having a third transmitter may be read from the RFID scanner to indicate that the third vehicle is located in spot A-23 associated with a third GPS-based geolocation. A fourth vehicle having a fourth transmitter may be read from the RFID scanner to indicate that the fourth vehicle is located in spot A-24 associated with a fourth GPS-based geolocation. A fifth vehicle having a fifth transmitter may be read from the RFID scanner to indicate that the fifth vehicle is located in spot A-25 associated with a fifth GPS-based geolocation.

An overflow inventory area may be located adjacent the "inventory" or storage lot. The overflow inventory area may be a designated region where automotive assets 102 are scanned with high-power handheld scanners 106 or equivalents by an operator or employee. The overflow inventory area may be configured to store automotive assets 102, such as vehicles, that are in excess to the storage capacity of the designated storage lot. The overflow area may be selectively filled when the designated storage lot is full, otherwise, the overflow area may not be utilized.

In some embodiments, downstream along the pathway from the designated storage lot may be a truck away area, Lot D 126, and a rail away area, Lot C 124. The truck away area, Lot D 126, and the rail away area, Lot C 124, may be designated regions where automotive assets 102 carrying individual respective passive transmitter tags 130 may be scanned with the handheld scanner 106, such as a handheld RFID scanner. The handheld scanner 106 may capture identifying information, including GPS-based geolocation coordinates. In some embodiments, the truck away area, Lot D 126, and the rail away area, Lot C 124, may permit users to walk in defined areas to obtain the identifying information when the user is within about 5 ft. of the automotive asset 102 or within about 10 ft. of the passive transmitter tag 130 affixed to the automotive asset 102.

The truck away area, Lot D 126, may be closely adjacent the designated storage lot and in one embodiment may simply be a region within the designated storage lot. In other embodiments, the truck away area, Lot D 126, may have parking spots drawn on the surface thereof. The geolocation of each parking spot within the truck away area, Lot D 126, may be pre-uploaded into the central cloud server 108. This may enable the central cloud server 108 to determine which spot the automotive asset 102 is within in the truck away area, Lot D 126, when an operator scans the passive transmitter tag 130 with the handheld scanner 106.

With continued reference to the truck away area, Lot D 126, a truck driver operating a tractor trailer may enter the truck away area, Lot D 126, with instructions, such as a work order or purchase order, to pick up a certain automotive asset 102. By way of example, in previous circumstances, a work order may have indicated to pick up a black NISSAN ALTIMA having VIN123456789. However, when the truck driver was in the truck away area, Lot D 126, it was difficult to find the exact vehicle. Thus, the truck driver may accidentally load a black NISSAN ALTIMA having VIN 987654321 onto the tractor trailer. Thus, the end user (e.g., a NISSAN car dealership) may have received the incorrect order (although it could be similar because it was still a black NISSAN ALTIMA, but the wrong VIN). The location management system may eliminate these types of errors amongst other advantages.

Inasmuch as the location management system may associate GPS coordinates from the GPS device with the passive transmitter tag 130, when the automotive asset 102 (e.g., a NISSAN ALTIMA) is transported to the truck away area, Lot D 126, the central cloud server 108 may know the exact spot, in which the vehicle is positioned. Thus, the truck driver may now be given the work order that says to load a black NISSAN ALTIMA having VIN 123456789 located in an exact location, such as first spot A-21, or the like. This may ensure that the downstream end destination, such as the NISSAN dealership, receives the proper ordered automotive asset 102.

A guard shack may be located near the exit of the truck away area, Lot D 126. In some embodiments, another handheld scanner 106 may be utilized to scan the passive transmitter tag 130 on the automotive asset 102 that is being removed from the truck away area, Lot D 126. Alternatively, another fixed scanning device 104 may be installed near the guard shack to scan and capture information from the passive transmitter tag 130 on the automotive asset 102 as it is being hauled away.

In some embodiments, an automotive asset 102 may be positioned in the truck away area, Lot D 126. When a truck driver needs to pick up the automotive asset 102 from the truck away area, Lot D 126, the manufacturer or plant property owner may provide a list of parking spot locations to the truck driver. The parking lot locations of the automotive assets 102 may have been previously created and stored in the database using the GPS-based geolocation coordinates registered against the previously surveyed parking lot spaces. By providing the truck driver with the exact spot of the automotive asset 102 that he needs to pick up and load onto the truck, the location management system may eliminate any guess work by the driver as to which automotive asset 102 is to be picked up and delivered to an end customer (e.g., a car dealership). The location management system may also provide the truck driver with the quadrant, within which the automotive asset 102 is located to further assist the driver with finding the spot location more quickly. After the correct automotive asset 102 is loaded onto the truck based on the known parking spot number provided to the truck driver, another handheld scanner 106 may read the passive transmitter tag 130 on the truck exiting the truck away area, Lot D 126, when passing the guard shack.

The rail away area, Lot C 124, may be located closely adjacent the designated storage lot. In some embodiments, the rail away area, Lot C 124, may be located within the designated storage lot. A scanning device 104 may be installed along the pathway near an exit of the rail away area, Lot C 124. The sixth fixed scanning device 104 may be located either within the interior of the rail away area, Lot C 124, or may be located outside of the rail away area, Lot C 124. In each instance, the scanning device 104 may receive transmitted information from the passive transmitter tag 130 on the automotive asset 102. The scanning device 104 may transmit the information about the automotive asset 102, including GPS-based geolocation, to a central cloud server 108, which may be coupled to a non-transitory storage medium.

A train on a rail may be located near the exit of the rail away area, Lot C 124. A train engineer, driver, or other train personnel may have a work order which indicates the exact item to be loaded onto the train and its exact geolocation within the rail away area, Lot C 124. This ensures that the person loading the automotive asset 102 onto the train does not accidentally load the wrong automotive asset 102.

In some embodiments, an automotive asset 102 may be positioned in the rail away area, Lot C 124. When a train engineer or other train working needs to pick up the automotive asset 102 from the rail away area, Lot C 124, the manufacturer or plant property owner may provide a list of parking spot locations to the train operator or worker. The parking lot locations of the automotive assets 102 may have been previously created and stored in the database based on the GPS-based geolocation coordinates registered against the previously surveyed parking lot spaces. By providing the train worker with the exact spot of the automotive asset 102 that he needs to pick up and load onto the train, the location management system may eliminate any guess work by the train worker as to which automotive asset 102 is to be picked up and delivered to an end customer (e.g., a car dealership). The location management system may also provide the train driver with the quadrant, within which the automotive asset 102 is located to further assist the train employee or worker with finding the spot location more quickly. After the correct automotive asset 102 is loaded onto the train based on the known parking spot number provided to the train worker, another handheld scanner 106 may read the passive transmitter tag 130 on the automotive asset 102 exiting the rail away area, Lot C 124.

In designated regions and/or areas with physical locations within or nearly outside the facility compound 100, a handheld scanner 106 may be used by an operator to capture information from the passive transmitter tag 130 on the automotive asset 102. For example, the handheld scanner 106 may be an RFID scanner that scans and captures information from an RFID tag on a vehicle. The handheld scanner 106 may also capture serialized information from the passive transmitter tag 130 that is encoded with asset identifying information. The central cloud server 108 may sync or otherwise marry the asset identifying information (e.g., VIN) with GPS-based geolocation coordinates to establish a precise location of the automotive asset 102 and record and store the same in a memory of the central cloud server 108.

As automotive assets 102 are scanned throughout the designated regions of the facility compound 100, the following SQL code may be used to allocate each automotive asset 102 into a designated area (e.g., parking space):

```
select top 1 ps.PSpot_id, pl.PLocation_id,
    pl.Parent_facility_id from ParkingSpot ps
        join ParkingArea pa on ps.PArea_id =
        pa.PArea_id
        join ParkingLocation pl on pa.PLocation_id =
        pl.PLocation_id
    order by
        ( acos( sin(C_RadLatitude) sin(@RadLat) +
        cos(C_RadLatitude) cos(@RadLat)
        cos(@RadLong − C_RadLongitude) )
```

Figure 5:
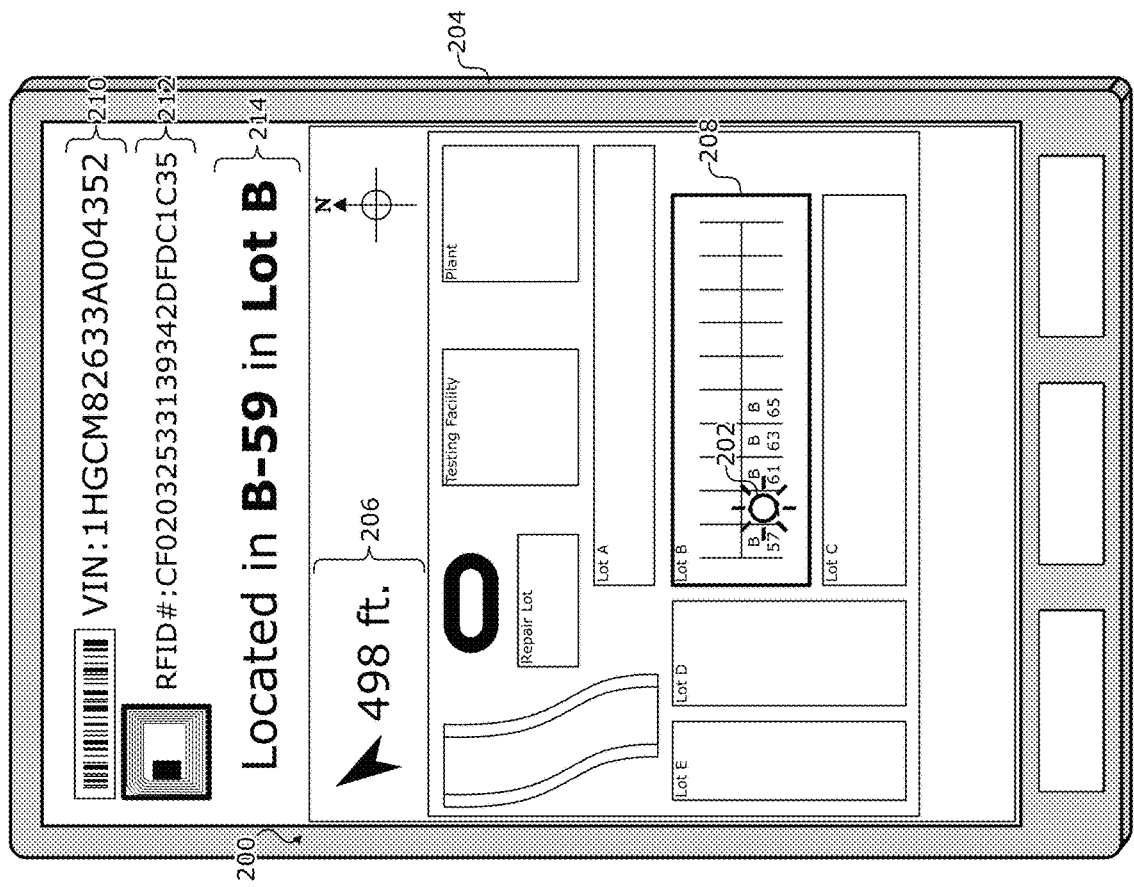
FIG. 5 is a schematic diagram illustrating an example map displaying the location information of a selected automotive asset on a device in communication with a location management system, in accordance with the present disclosure.

As shown in FIG. 5, the location management system may include software and/or other applications to be run on a computer or mobile device. For example, the system may include a non-transitory computer readable storage medium having instructions encoded thereon, that when executed by one or more processors (which may also be referred to as "tracking logic") track the location of the automotive asset 102 relative to the manufacturing plant 110 and the designated regions and/or areas.

The location management system software may allow a user to search the database stored on the cloud server 108 for asset identification information 132 and/or unique identification information of the passive transmitter tag 130 via a user interface. For example, the device 204 in communication with the location management system may import, scan, or otherwise receive input of the VIN 210 and/or RFID serial number 212 for an automotive asset 102. The location management system software may the query the database for the location or other information about the given automotive asset 102. In response, the location management system software may display the location information for the automotive asset 102. For example, the mobile app may display the designated region and/or area 214 associated with the automotive asset 102. Additionally, the location management system app may include a map rendering module, which may display a map 200 of the relevant facility compound associated with the automotive asset 102. The map 200 may include a representation 202 of the automotive asset 102 indicating the location of the automotive asset 102 within the map. Additionally, the map 200 may display a visual indication of the designated region 208, in which the automotive asset 102 is located. Further, the map 200 may include relative direction information 206 that indicates to the user the distance and direction of the automotive asset 102, based on the location information of both the user and the automotive asset 102. Alternatively, the relative direction information 206 may be based on the location information for a designated starting point rather than the user's current location. This may allow a copy of the map 200 to be easily shared with others, such as a transporter, who may be located at a truck lot or entrance.

Software functionality may be available in Container Optimization Solutions (COS) software. The COS software may be a web-based application. An instance of COS may be customized for the manufacturing facility to add extra functionality, however there are several areas that may be turnkey and available without further development. The system may use Simple Object Access Protocol (SOAP) or Representational State Transfer (REST) web services to integrate with customers as they are scalable and easily deployed but are open to other methods and have experience with the same. In some embodiments, users may view vehicle location information and produce reports via the COS software. Additionally, the system may pass vehicle location data, including VINs and current location to the tracking solution.

Legacy or existing light posts or the like may be labeled throughout the facility compound 100 to give employees and others visual cues of the designated area boundaries. In some embodiments, to find a vehicle parked in a certain designated area or anywhere in the facility compound 100, users may be able to utilize a seek and find feature on a handheld device to locate the vehicle. This may operate like a metal detector, for example, that starts making an audible noise more frequently when the user is near the vehicle, for which they are searching. Alternatively, the handheld device 204 may indicate to the employee the spot, in which the vehicle is parked.

In some embodiments, the GPS-based geolocation coordinates may be used by the central cloud server 108 or another processor to query the manufacturer's database to determine the exact location of the automotive asset 102 within either the designated storage lot, the rail away area, Lot C 124, or the truck away area, Lot D 126. The coordinates may also be associated with the specific parking spots so as to allow users to know a spot location of the automotive asset 102. In some embodiments, associating the parking spot with the passive transmitter tag 130 may be accomplished by cross-referencing at least one read attribute with survey data captured by an installer during a pre-launch visit/survey of the facility compound 100.

The survey data may be gathered in accordance with known methods or tools implementing surveying methods such as a cosmolabe, a dioptra, a theodolite, a half theodolite, a plain theodolite, a simple theodolite, a great theodolite, a non-transit theodolite, a transit theodolite, a seconds theodolite, a electronic theodolite, a mining theodolite, a suspension theodolite, a traveling theodolite, a pibal theodolite, a registering theodolite, a gyro-theodolite, a construction theodolite, a photo-theodolite, a robotic theodolite, a vernier theodolite, a tachymeter (surveying), a graphometer, a universal instrument (surveying), a rransit (surveying), a total station, an alidade, an alidade table, a plane table, a dumpy level, a tape (surveying), a measuring tape, a surveyor's chain, an engineer's chain, one or more ramsden surveying instruments, and/or a ranging rod. In some embodiments, the installer of system obtains hundreds, thousands, or tens of thousands of surveying readings using some of the aforementioned surveying tools to map the entire facility compound 100 into generalized and finite locations such as parking spot A-21 or a "put away location." During the survey of the facility compound 100, existing legacy fixtures, such as lamp posts may be utilized to divide areas in to a plurality of different quadrants.

In some embodiments, to facilitate vehicle location data specific to the parking space, the setup of the facility compound 100 may include conducting a survey and plotting the GPS latitude and longitude coordinates of each parking space, as well as all other designated areas that will be used to specifically track vehicle location. Overflow and repair areas may utilize a designated regions approach, in which the property is divided into 50 ft.×50 ft. quadrants, for example. The current location of vehicles in these areas may be available at a quadrant level (e.g., "VIN 2313432123412312 is currently in Repair—Quadrant 10").

The survey plots may be inlaid with a geographic view of the facility compound 100 obtained from satellite imagery, such as Google Earth or the like. The location accuracy can be graphed on this same map to enable the manufacturer to see the location of the automotive asset 102 based on GPS-based geolocation of the automotive asset 102 represented in the computer generated projection map registered with satellite imagery. Similarly, users may be able to see a map of the facility compound 100, and search for vehicles by VIN. The search may return the location of the automotive asset 102 as last reported via scan.

Within some designated regions (e.g., repair lot 114), facility vehicles (such as golf carts, people movers, or the like) transport employees carrying handheld scanners 106. The handheld scanners 106 may receive transmitted information from the passive transmitter tag 130 on the automotive asset 102 (such as the automobile in the overflow repair facility). In some embodiments, employees may walk the designated regions with an RFID handheld reader that is deliberately configured with low power. Using this RFID handheld, the user may be able read and obtain tag data from all vehicles parked in these designated areas of the facility compound 100. The low-power handheld scanner may require the user to get within about 3-4 ft. of the passive transmitter tag 130 to be able to read it. In some embodiments, the proximity of the handheld scanners 106 to passive transmitter tag 130 may allow the system to capture the current GPS coordinates of the read, which may passed to the database at a level of granularity capable of producing parking lot-specific location within about 3 m.

In other embodiments, vehicle location in designated overflow and repair areas may be recorded at a quadrant level. The size of each quadrant and the number of total quadrants to be incorporated may be based on the size of the facility compound 100. This approach may allow employees to utilize a handheld signal scanner 106 (i.e., a transceiver) with a higher RFID signal or power setting. The higher power setting may enable a user to get within about 20-25 ft. of the vehicle and acquire tag reads from a moving vehicle at a rate of speed typically associated with a golf cart or other people moving vehicle. In some embodiments, passive transmitter tags 130 may be read from about 10 ft. away by high-power scanners 106 at speeds up to about 60 mph.

The location accuracy provided as part of the system may be specific to the classification of the area. In some cases, users may be able to see a map of the facility compound 100, and search for vehicles by VIN, for example. The search may return the location of the vehicle as last reported via scan.

Some variations in location accuracy may be provided minimize the need for human intervention. For example, vehicle location in the inventory and truck away and rail away areas may be provided at a parking space-specific level within about 3 m, for example. Tag data in certain areas may be acquired utilizing high-power readers, and other areas may utilize low-power units. Still other areas may utilize fixed portals.

Two different RFID data capture devices may be leveraged to accomplish the system objectives. All location data may be captured utilizing RFID handheld or mobile devices. Milestone data may be captured using RFID fixed portals installed at choke and exit points. In both methodologies, vehicles may be tagged with a RFID tag and have the tag number and VIN association uploaded to the cloud database, to create a systematic understanding of what tag number is associated with what vehicle. A scan may be required during the assembly process that marries the RFID tag placed on the vehicle's bumper or the like and that same vehicle's VIN, via a bar code scan of each.

Figure 6:
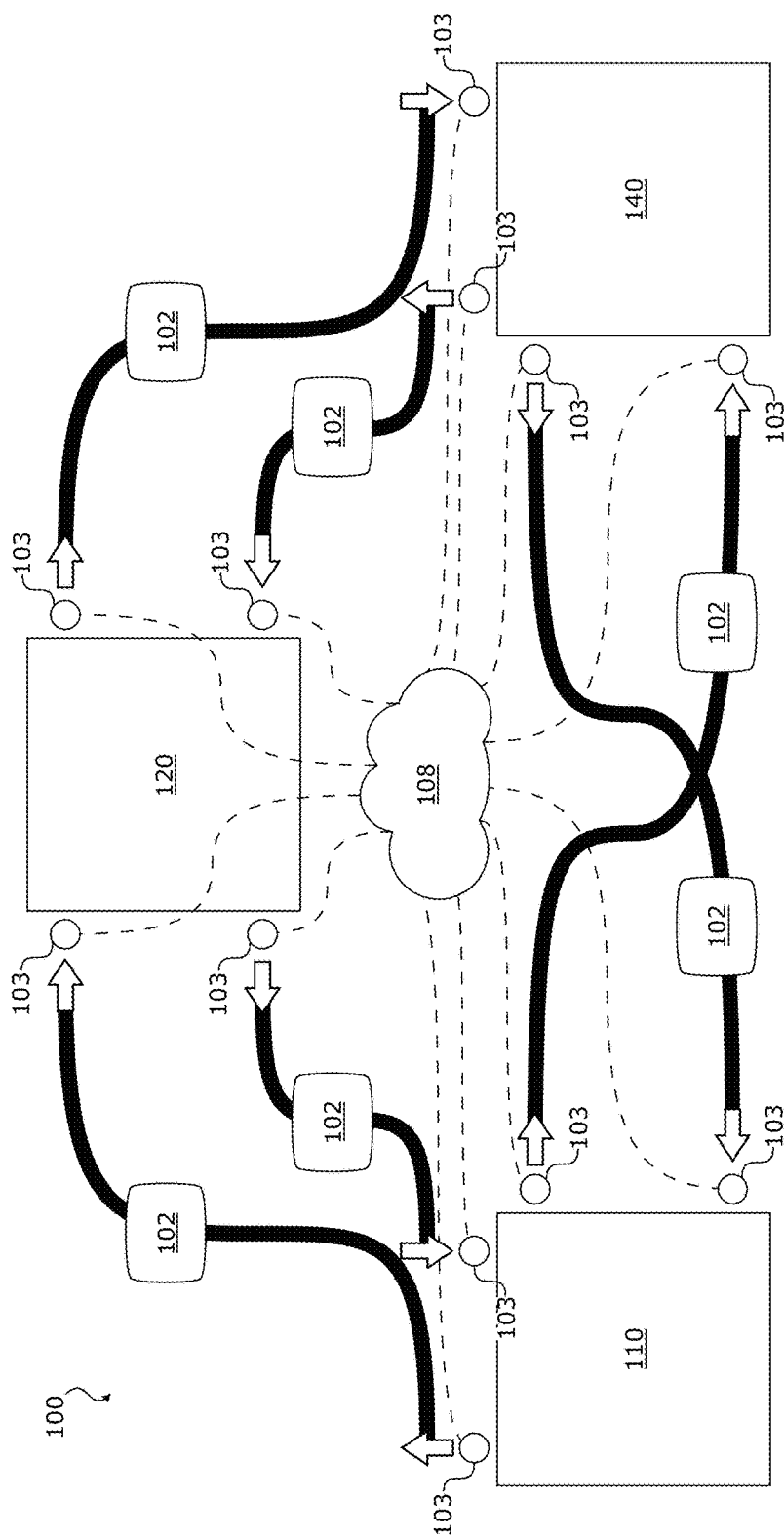
FIG. 6 is a schematic diagram illustrating automotive assets moving between facilities equipped with scanning devices in communication with a location management system, in accordance with the present disclosure.

As shown in FIG. 6, the location management system may include tracking data across a set of multiple facilities 300. For example, automotive assets 302 may be tracked between an OEM's plant 310, a remote warehouse 320, and a tier supplier's facilities 330. The facilities 310, 320, 330 may include fixed scanners 304 at the ingresses and egresses. As a tagged asset 302 approaches or departs from a fixed scanner 304, the location management system may automatically update the location and/or status of the tagged asset 302 in the cloud 308. For example, the fixed scanner 304 may detect that a tagged asset 302 is moving in the direction away from the warehouse facility 320, so the location management system may automatically update the status of the automotive asset 302 to "En Route" or "In Transit". Additionally, before leaving the warehouse facility 320, the location management system may be updated to include the destination information about the automotive asset 302.

At the time of transport, an automotive asset 302 may be associated with the identifying information for the transport vehicle and/or a device within the transport vehicle that may be in communication with the location management system (e.g., cell phone, tablet, other mobile device). In this way, the location management system may be updated with the real-time location information of the automotive asset 302 within the cargo of the transport vehicle while en route. Advantageously, this may allow the location management system to predict arrival times and/or track delays for the automotive assets 302, providing the system with information in time to respond and plan accordingly. For example, a shipment of automotive assets 302 may be diverted to another destination in response to another delayed shipment.

The various facilities 310, 320, 330 may each have differing levels of access to location and other data about the automotive assets 302. The OEMs, suppliers, and other logistics management system users may have varied access to the collected data resident on the centralized integration and analytics platform, as well as various analytics that may be applied to the collected data at this layer. This varied access may be selective and by permission. Thus, the present disclosure provides a common platform that may aggregate, compile, and provide informational visibility of sensor-based data from automotive assets 302 and/or associated environmental, carrier, and facility peripheral devices, to participating entities as privileged and permissioned by the users and their agents as acquired through the common supply-chain data capture points, nodes, and/or hubs. Some categories of the data available in the logistics management system cloud may include real-time location, relative velocities, acceleration, impact forces, and/or analytical statistics associated with the movement of automotive assets 302, parts, and other supply-chain support components. This informational logistics ecosystem may enable end-to-end visibility through data collection and authorized sharing and/or distribution. As a non-limiting example, the sensor data collection points and/or tag readers may be programmed as part of the logistics management system to trigger statistical calculations for compiled analytics and/or data sharing events, such as alert messages to selected users and/or system controllers. This data system automation may be customized to particular interactive collection points/hubs, users, authorization levels, and/or limits/thresholds (e.g., time, geolocation, velocity, acceleration, impact, calculated statistics). Information available to a supplier may include, but is not limited to, supplier inventory data, inbound and outbound dock door portal transaction data at the supplier's location, inbound and outbound dock door portal transaction data at a cross dock/logistics center, and inbound and outbound dock door portal transaction data at the OEM.

Further, the logistics management system's tiered suppliers and/or other users may participate in supply-chain visibility through the selection of various participation methodologies approved by a data ecosystem governance committee and application, for example, while aggregate statistical data in a common database may be extensible to the all system participants. This data access management may be provided through a reduced-cost cloud-based integration and analytics platform to address issues and provide commonality to a mass-collective of OEMs and suppliers.

In some embodiments, the automotive assets 302 may be containers. For example, the automotive assets 302 may be reusable RFID containers that interact with transaction data collection points provided by the fixed scanners 304. The supply-chain data may be collected from tagged assets (inbound and outbound) at multiple RFID portals/RFID handhelds associated with multiple OEMs, suppliers, warehouses, etc. The supply-chain data may include information about the contents, particular parts, part numbers, serial numbers, UPC codes, weights, quantities, materials/hazards, origins/destinations, times of arrivals/departures, correlated time and location data, security, authorized carriers/recipients, expiration dates, storage temperatures, prices, purchase orders, related shipment containers, and/or dimensions. This data may be collected at secure local layers and transmitted to a centralized integration and analytics platform in the cloud 308. The centralized integration and analytics platform may operate at a secure application layer, ensuring database layer integrity. Tagging and data collection, or reading and writing information to electronic tags on reusable RFID containers, may conform with group-accepted standards.

The reusable RFID containers may include RFID and/or other types of data tags that include unique identifying information about each container itself. The data tags may be programmed to store data related to the particular contents of each container. Additionally, the stored data in the data tags may include identifying information about related containers associated with the same shipment or entity. This programming may occur at any of the data collection points/nodes, provided the programmer has read/write authorization. Otherwise, the stored data may be read-only to the tag reader, but may trigger other write events, such as to a networked hub of the logistics management system. For example, attempts to re-program the tag of a reusable RFID container by an unauthorized user may trigger a data write entry within a log file, while other stored data within the data tag remains unchanged. The data tags may be removable or integrated into the containers, shipment labels, and/or pallets used with the logistics management system.

In some embodiments, the location management system may track the location of any reusable RFID containers and their status as empty or full of contents. While the location of a particular empty container at the OEM's or other user's facility may not be visible to a supplier, the system may provide the supplier with the information that an empty container is available within a certain distance range and/or may be scheduled to be delivered within a certain time range, such that the supplier may request empty reusable RFID containers for the return or replacement of parts. Additionally or alternatively, the logistics management system may automatically schedule the pick-up and delivery of empty containers based on a return or replacement request from the supplier. The logistics management system may utilize information, such as known route schedules, cargo manifests, weight and space restrictions, and/or the location of empty containers, for example, to optimize pick-up and delivery schedules automatically. The system may also utilize automatically and/or manually uploaded user and/or sensor data to reschedule and/or reroute container shipments in real-time. The logistics management system may make automatic changes to shipments and/or may suggest recalculated changes, which may be approved or disregarded by users. Similarly, users may override automated or scheduled shipments provided by the logistics management system, which may recalculate shipment data in response to any override. Users may manually update the empty or full status of reusable RFID containers at loading/unloading. Additionally or alternatively, the reusable RFID containers may include sensors indicating open or closed status of the container and/or otherwise detect the presence of contents within the container, which may trigger a data upload or status update with the central hub or cloud of the logistics management system.

Figure 7:
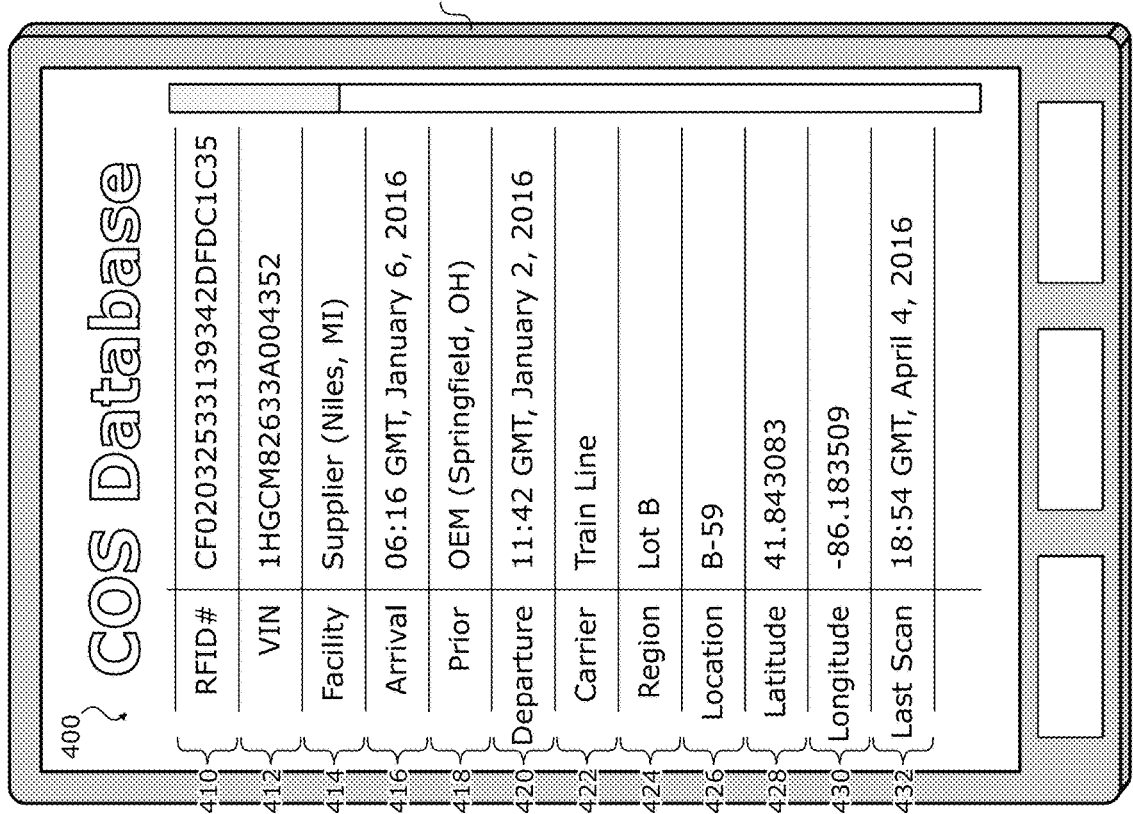
FIG. 7 is a schematic diagram illustrating an example table displaying information about a selected automotive asset on a device in communication with a location management system, in accordance with the present disclosure.

As shown in FIG. 7, the location management system may store data in a table 400, accessible via a computer and/or mobile device 404. The table 400 may be displayed to a user on a dynamic user interface and may include information such as: unique identification information 410 for the passive transmitter tag, asset identification information 412, facility location information 414, arrival information 416, previous facility location information 418, departure information 420, transportation information 422, designated region information 424, designated area information 426, latitude information 428, longitude information 430, time and date information of the last scan 432, and/or other information. The data displayed in the table 400 may be manually editable for updating the location management system based on a permissions level.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a non-transitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the present disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the preferred embodiment of the disclosure are an example and the disclosure is not limited to the exact details shown or described.

Although disclosed systems and methods are illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are contemplated thereby.

What is claimed is:

1. A method for managing location information of tagged automotive assets, the method comprising:
    assigning, in a database, location information to a plurality of designated regions, the location information of the plurality of designated regions defining a perimeter around each of the plurality of designated regions;
    assigning, in a database, unique location information to a plurality of designated areas nested within at least one designated region of the plurality of designated regions, each of the plurality of designated areas sized to receive a singular automotive asset therein;
    during a process of arranging an automotive asset within one designated region of the plurality of designated regions, scanning a passive transmitter tag affixed to the automotive asset, the passive transmitter tag having unique identification information, wherein the scanning is executed from a perspective of a fixed scan point associated with the one designated region, the fixed scan point being one of a plurality of fixed scan points, each of the plurality of fixed scan points being associated with one of the plurality of designated regions;
    obtaining, from the passive transmitter tag, the unique identification information in response to the scanning;
    associating, in the database, the unique identification information with the one designated region based on which of the plurality of fixed scan points is associated with the scanning of the passive transmitter tag; and
    after a process of arranging the automotive asset within a designated area of the plurality of designated areas, (1) automatically scanning the passive transmitter tag affixed to the automotive asset with a mobile scanner once the automotive asset is within a scanning range of the mobile scanner, (2) obtain location information of the mobile scanner at a time the passive transmitter is scanned, and (3) associating the automotive asset with the designated area by cross referencing the location information of the mobile scanner with the unique location information of the plurality of designated areas,
    wherein associating the unique identification information obtained from the passive transmitter tag with the one designated region includes uploading the unique identification information to the database stored in a cloud server, and the database is searchable by the automotive asset.

2. The method of claim 1, wherein the location information of the plurality of designated regions, the unique location information of the plurality of designated areas, and the location information of the mobile scanner each includes latitude and longitude information.

3. The method of claim 1, further comprising associating the unique identification information with the one designated region based on the fixed scan point with respect to the perimeter of the one designated region defined by the location information thereof.

4. The method of claim 1, wherein associating the unique identification information obtained from the passive transmitter tag with the one designated region includes storing the unique identification information in a table of the database.

5. The method of claim 1, wherein the automotive asset is a vehicle.

6. The method of claim 1, wherein the automotive asset is a container for automobile parts.

7. The method of claim 6, wherein the container is reusable.

8. The method of claim 1, wherein scanning the passive transmitter tag from the perspective of the fixed scan point includes using a portable transceiver to obtain the unique identification information from the passive transmitter tag.

9. The method of claim 8, wherein the portable transceiver is a handheld scanner.

10. The method of claim 1, wherein scanning the passive transmitter tag includes scanning with a relative velocity of up to about 60 mph between the fixed scan point and the passive transmitter tag.

11. The method of claim 1, wherein the passive transmitter tag is a radio frequency identification tag.

12. The method of claim 1, wherein assigning location information to the plurality of designated regions includes obtaining the location information for at least four points along the perimeter of each of the plurality of designated regions.

13. The method of claim 12, further including determining the location information for a central point associated, in the database, with the fixed scan point of the one designated region based on an interpolation of the location information for the at least four points along the perimeter of the one designated region.

14. The method of claim 1, wherein the fixed scan point includes a fixed transceiver within the one designated region for scanning the passive transmitter tag when the automotive asset is near.

15. The method of claim 1, further comprising displaying a representation of the automotive asset on a map based on the associated location information.

16. The method of claim 15, further comprising determining directions to the automotive asset based on a user location relative to the automotive asset.

17. The method of claim 1, wherein the singular automotive asset being one of a vehicle and a container for automotive parts.

* * * * *